(12) United States Patent
Hu et al.

(10) Patent No.: US 11,327,586 B2
(45) Date of Patent: May 10, 2022

(54) TOUCH DISPLAY DEVICE AND METHOD OF FABRICATING SAME

(71) Applicant: SHENZHEN CHINA STAR OPTOELECTRONICS SEMICONDUCTOR DISPLAY TECHNOLOGY CO., LTD., Guangdong (CN)

(72) Inventors: Chongming Hu, Guangdong (CN); Yuchun Hsiao, Guangdong (CN); Guofu Tang, Guangdong (CN); Mingjun Zhou, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 76 days.

(21) Appl. No.: 16/620,175

(22) PCT Filed: Nov. 5, 2019

(86) PCT No.: PCT/CN2019/115617
§ 371 (c)(1),
(2) Date: Dec. 6, 2019

(87) PCT Pub. No.: WO2021/000479
PCT Pub. Date: Jan. 7, 2021

(65) Prior Publication Data
US 2021/0278914 A1 Sep. 9, 2021

(30) Foreign Application Priority Data
Jul. 4, 2019 (CN) .......................... 201910610126.3

(51) Int. Cl.
*G06F 3/041* (2006.01)
*B32B 7/12* (2006.01)
*B32B 37/12* (2006.01)

(52) U.S. Cl.
CPC ............... *G06F 3/041* (2013.01); *B32B 7/12* (2013.01); *B32B 37/1284* (2013.01);
(Continued)

(58) Field of Classification Search
USPC ......... 345/173, 174, 156; 428/38; 156/275.5
See application file for complete search history.

(56) References Cited

U.S. PATENT DOCUMENTS 10,884,520 B2 * 1/2021 Togashi ................ G06F 3/0393
10,921,628 B2 * 2/2021 Togashi .............. G02F 1/13338
(Continued)

FOREIGN PATENT DOCUMENTS

CN 104133587 A 11/2014
CN 107678580 A 2/2018
(Continued)

*Primary Examiner* — Thuy N Pardo
(74) *Attorney, Agent, or Firm* — PV IP PC; Wei Te Chung; Ude Lu

(57) ABSTRACT

The present disclosure provides a touch display device including a display panel, a touch panel, and a cover plate. The side of the touch panel adjacent to the display panel is provided with a recess and a surrounding portion surrounding the recess. By vacuuming the gap formed between the display panel and the touch panel, a portion of the touch panel is recessed into the gap, which reduces the space occupied by the gap, eliminates the sense of space, enhances waterproof and dustproof effects and elevates stability.

20 Claims, 6 Drawing Sheets

(52) U.S. Cl.
 CPC ......... *B32B 2037/1253* (2013.01); *B32B 2310/0831* (2013.01); *B32B 2457/208* (2013.01); *G06F 2203/04103* (2013.01)

(56) References Cited

U.S. PATENT DOCUMENTS

| | | | |
|---|---|---|---|
| 11,022,831 B2* | 6/2021 | Nagasaki | G02F 1/133602 |
| 2011/0227848 A1* | 9/2011 | Furusawa | G06F 1/1626 |
| | | | 345/173 |
| 2014/0178618 A1* | 6/2014 | Tanabe | B32B 17/06 |
| | | | 428/38 |
| 2016/0068718 A1* | 3/2016 | Suwa | B32B 38/0008 |
| | | | 156/275.5 |
| 2016/0221315 A1 | 8/2016 | Saiki | |
| 2017/0088749 A1* | 3/2017 | Tsuchida | B32B 38/18 |
| 2018/0284893 A1* | 10/2018 | Shimizu | G06F 3/016 |
| 2019/0129219 A1* | 5/2019 | Fujita | G02F 1/133514 |
| 2019/0137810 A1* | 5/2019 | Yoshida | G02F 1/133512 |
| 2020/0081557 A1* | 3/2020 | Togashi | G06F 3/0393 |
| 2020/0157395 A1* | 5/2020 | Liu | B32B 27/06 |
| 2020/0185538 A1* | 6/2020 | Yamazaki | H01L 29/78696 |

FOREIGN PATENT DOCUMENTS

| | | |
|---|---|---|
| CN | 109508121 A | 3/2019 |
| CN | 109656404 A | 4/2019 |

\* cited by examiner

TOUCH DISPLAY DEVICE AND METHOD OF FABRICATING SAME

BACKGROUND OF INVENTION

Field of Invention

The present disclosure relates to a field of display technologies, and in particular, to a touch display device and a method of fabricating the same.

Description of Prior Art

The touch display device mainly includes a display panel, a touch panel and a cover plate. The display panel is bonded to the touch panel mainly by methods including frame-bonding and full-bonding, wherein the full-bonding is to completely bond the display panel to the touch panel in a seamless manner by using a liquid optical glue or a solid optical glue, while the frame-bonding is to bond the display panel to a frame of the touch panel, thereby forming a gap between the display panel and the touch panel. Compared with the full-bonding, the frame-bonding has advantages of a simple process, easy operation, low cost, and easy rework.

As shown in FIG. 1, the touch display device includes a display panel 101, a touch panel 103 disposed on the display panel 101, and a cover plate 105 disposed on the touch panel 103. The display panel 101 and the touch panel 103 are bonded together by frame bonding, and the first colloid 102 is disposed between the display panel 101 and the touch panel 103 for the bonding. The touch panel 103 is bonded to the cover plate 105 by full-bonding, and a second colloid 104 is disposed between the touch panel 103 and the cover plate 105 for the bonding. However, there is a gap 106 between the display panel 101 and the touch panel 103, which may result in poor stability of the touch display device, and the user may have a sense of separation when using the touch display device, causing a poor touch feeling. Meanwhile, the presence of the gap results in relatively inferior waterproof and dustproof effect of the touch display device.

In summary, there is a need to provide a new touch display device and a method of fabricating the same to solve the above technical problems.

SUMMARY OF INVENTION

The present disclosure provides a touch display device and a method of fabricating the same, which solves the technical problem of sense of separation, poor stability, and relatively inferior waterproof and dustproof effect caused by a gap between the display panel and the touch panel in the conventional touch display device.

In order to solve the above problems, the technical solution provided by the present disclosure is as follows:

An embodiment of the present disclosure provides a touch display device, including:

a display panel;

a touch panel disposed on the display panel, and a side of the touch panel adjacent to the display panel is provided with a recess and a bonding portion surrounding the recess, wherein the recess is located at a middle of the touch panel, the bonding portion is located at a peripheral of the touch panel, and the recess is recessed toward a side of the display panel; and a cover plate disposed on the touch panel, wherein a first colloid is disposed on an area corresponding to the bonding portion between the display panel and the touch panel, to bond the display panel with the touch panel; a second colloid is disposed between the touch panel and cover plate, to bond the touch panel with the cover plate; and a cavity is enclosed between the display panel, the touch panel, and the first colloid.

A touch display device according to an embodiment of the present disclosure, a surface of a side of the recess adjacent to the display panel is a curved surface.

A touch display device according to an embodiment of the present disclosure, a surface of a side of the touch panel adjacent to the cover plate is a horizontal surface, and a thickness of the touch panel corresponding to the recess is greater than a thickness of the touch panel corresponding to the bonding portion.

A touch display device according to an embodiment of the present disclosure, a minimum vertical distance between the surface of the side of the recess adjacent to the display panel and the display panel is zero.

A touch display device according to an embodiment of the present disclosure, the cavity is vacuumed.

A touch display device according to an embodiment of the present disclosure, the first colloid completely fills the cavity to completely bond the display panel to the touch panel.

A touch display device according to an embodiment of the present disclosure, the first colloid is made of an optical glue.

An embodiment of the present disclosure provides a touch display device, including:

a display panel;

a touch panel disposed on the display panel, and a side of the touch panel adjacent to the display panel is provided with a recess and a bonding portion surrounding the recess; and a cover plate disposed on the touch panel, wherein a first colloid is disposed on an area corresponding to the bonding portion between the display panel and the touch panel, to bond the display panel with the touch panel; a second colloid is disposed between the touch panel and cover plate, to bond the touch panel with the cover plate; and a cavity is enclosed between the display panel, the touch panel, and the first colloid.

A touch display device according to an embodiment of the present disclosure, a surface of a side of the recess adjacent to the display panel is a curved surface.

A touch display device according to an embodiment of the present disclosure, a surface of a side of the touch panel adjacent to the cover plate is a horizontal surface, and a thickness of the touch panel corresponding to the recess is greater than a thickness of the touch panel corresponding to the bonding portion.

A touch display device according to an embodiment of the present disclosure, a minimum vertical distance between the surface of the side of the recess adjacent to the display panel and the display panel is zero.

A touch display device according to an embodiment of the present disclosure, the cavity is vacuumed.

A touch display device according to an embodiment of the present disclosure, the first colloid completely fills the cavity to completely bond the display panel to the touch panel.

A touch display device according to an embodiment of the present disclosure, the first colloid is made of an optical glue.

A touch display device according to an embodiment of the present disclosure, the first colloid is made of a hot melt adhesive.

A touch display device according to an embodiment of the present disclosure, the first colloid has a rectangular ring shape.

An embodiment of the present disclosure provides a method of fabricating a touch display device, including the following steps:

S10: coating a first colloid at a peripheral of a display panel or a peripheral of a touch panel;

S20: delivering the cover plate and the display panel into a vacuum chamber, and vacuuming the vacuum chamber by using a vacuum pump in a sealed environment;

S30: aligning and bonding the display panel with the touch panel, wherein a middle of a side of the touch panel adjacent to the display panel is recessed toward a side of the display panel to form a recess, and a cavity is enclosed between the display panel, the touch panel, and the first colloid;

S40: coating a second colloid on the touch panel or the cover plate; and

S50: aligning and bonding the touch panel with the cover plate.

According to the method of fabricating the touch display device according to an embodiment of the present disclosure, in the step S30, a CCD alignment or a tool-assisted positioning is used for alignment.

According to a method of fabricating the touch display device according to an embodiment of the present disclosure, the first colloid completely fills the cavity to completely bond the display panel and the touch panel.

Beneficial effects of the present disclosure are that the present invention provides a touch display device and a method of fabricating the same, wherein by vacuuming a gap formed between a display panel and a touch panel, an area of the touch panel corresponding to the gap is recessed toward inside of the gap, thereby reducing a space occupied by the gap, eliminating a sense of separation between the display panel and the touch panel, improving the user's touch feeling, enhancing a waterproof and dustproof effect of the touch display device, elevating stability of the touch display device, and so on.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1:
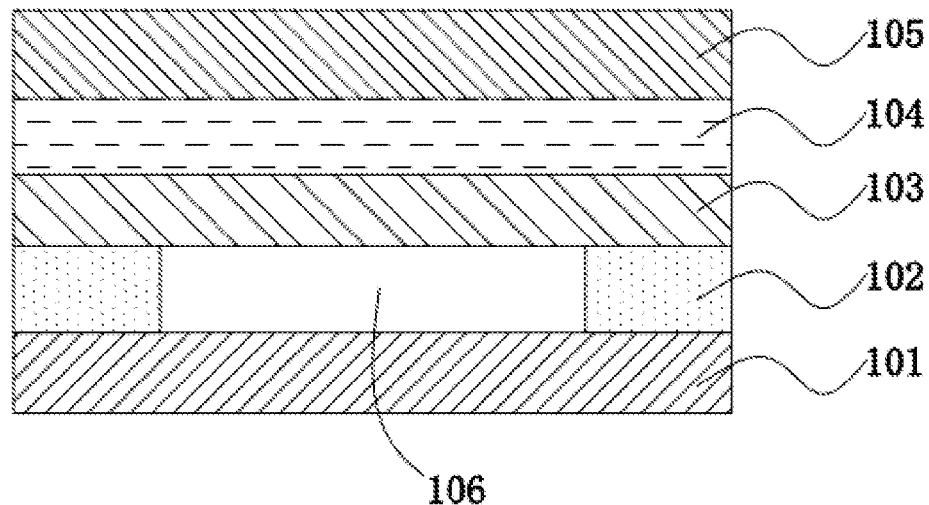
FIG. 1 is a schematic cross-sectional diagram of a touch display device of the prior art.

The following description of the various embodiments is provided to illustrate the specific embodiments of the invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the invention. In the figures, structurally similar elements are denoted by the same reference numerals.

The present disclosure provides an embodiment, which can solve the technical problems of sense of separation, poor stability, and relatively inferior waterproof and dustproof effect due to a gap between the display panel and the touch panel in the conventional touch display device.

Embodiment 1

Figure 2A:
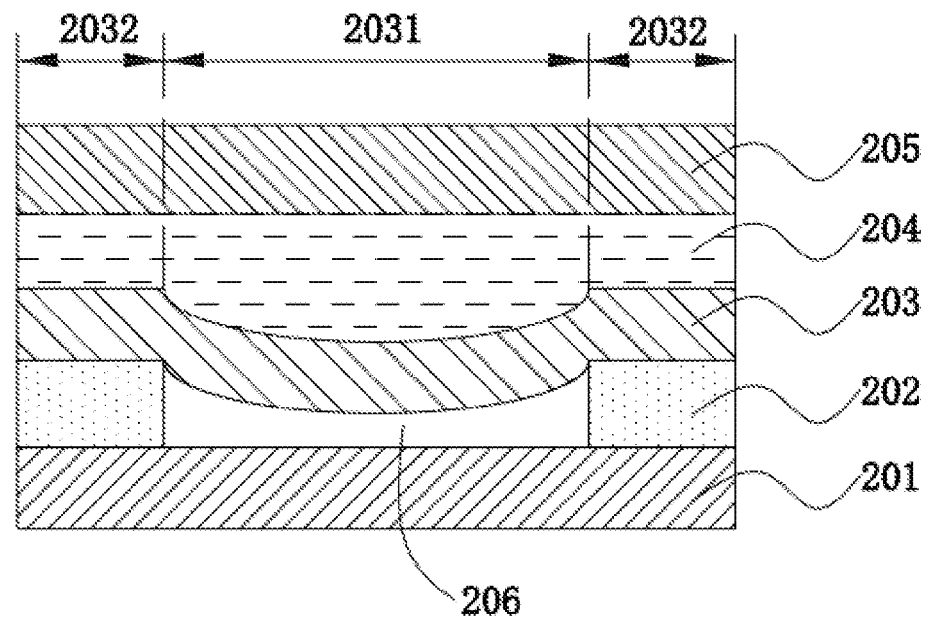
FIGS. 2A-2C are schematic cross-sectional diagrams of a touch display device according to Embodiment 1 of the present disclosure.

As shown in FIG. 2A, the touch display device provided by this embodiment of the present disclosure includes a display panel 201, a touch panel 203, and a cover plate 205.

The display panel 201 may be a liquid crystal display panel, an organic light emitting diode display panel, or the like, and may be other types of display panels, which is not particularly limited in this embodiment of the present disclosure.

The touch panel 203 is disposed on the display panel 201. A side of the touch panel 203 adjacent to the display panel 201 is provided with a recess 2031 and a bonding portion 2032 surrounding the recess 2031. The recess 2031 is located at a middle of the touch panel 203 and is recessed toward a side of the display panel 201. The bonding portion 2032 is located at a peripheral of the touch panel 203 for setting a sealant for attaching the display panel 201 to the touch panel 203.

The cover plate 205 is disposed on the touch panel 203, and the cover plate 205 can be a cover plate glass for protecting an overall structure of the touch display device.

The display panel 201 and the touch panel 203 are attached to each other by frame-bonding, so a first colloid 202 is disposed on an area corresponding to the bonding portion between the display panel 201 and the touch panel 203, to bond the display panel 201 with the touch panel 203. Since shapes of the display panel 201 and the touch panel 203 are rectangular, a shape of the first colloid 202 is a rectangular ring shape.

The touch panel 203 and the cover plate 205 are bonded by full-bonding, and therefore a second colloid 204 is disposed between the touch panel 203 and cover plate 205, to bond the touch panel 203 with the cover plate 205.

Specifically, the first colloid 202 is made of an optical glue, which may be a hot melt adhesive, and can be melted by heating to realize the bonding of the display panel to the touch panel 203. The configuration and processing manner of the second colloid 204 are not particularly limited in this embodiment of the present disclosure.

The display panel 201, the touch panel 203, and the first colloid 202 enclose a cavity 206. It is understood that the recess 2031 is recessed toward the display panel 201, so that actually, the cavity 206 is surrounded by the display panel 201, the recess 2031, and the first colloid 202.

Specifically, the middle of the touch panel 203 may be recessed into the cavity 206 by applying an external force to form the recess 2031. However, since the touch panel 203 is a precision component, in order to prevent the external force from causing damage of the touch panel 203, preferably, the air in the cavity 206 is completely exhausted to form a vacuum environment, and the middle of the touch panel 203 is subjected to pressure toward the display panel 201 caused by a difference in air pressure between inside and outside of the cavity 206. Therefore, the side of the touch panel 203 adjacent to the display panel 201 is slightly deformed to form the recess 2031 recessed into the cavity 206.

Specifically, in FIGS. 2A-3C, a surface of a side of the recess 2031 adjacent to the display panel 201 is a curved surface, and the recess 2031 is recessed toward a side of the display panel 201, so a surface of a side of the recess 2031 away from the side of the display panel 201 is also a curved surface.

Figure 2B:
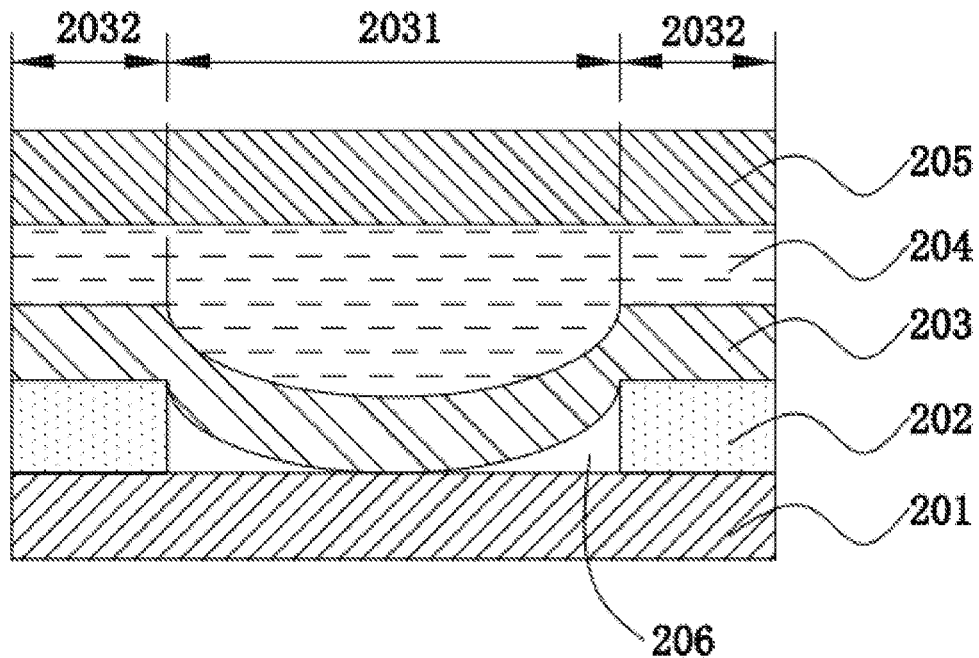
Figure 2C:
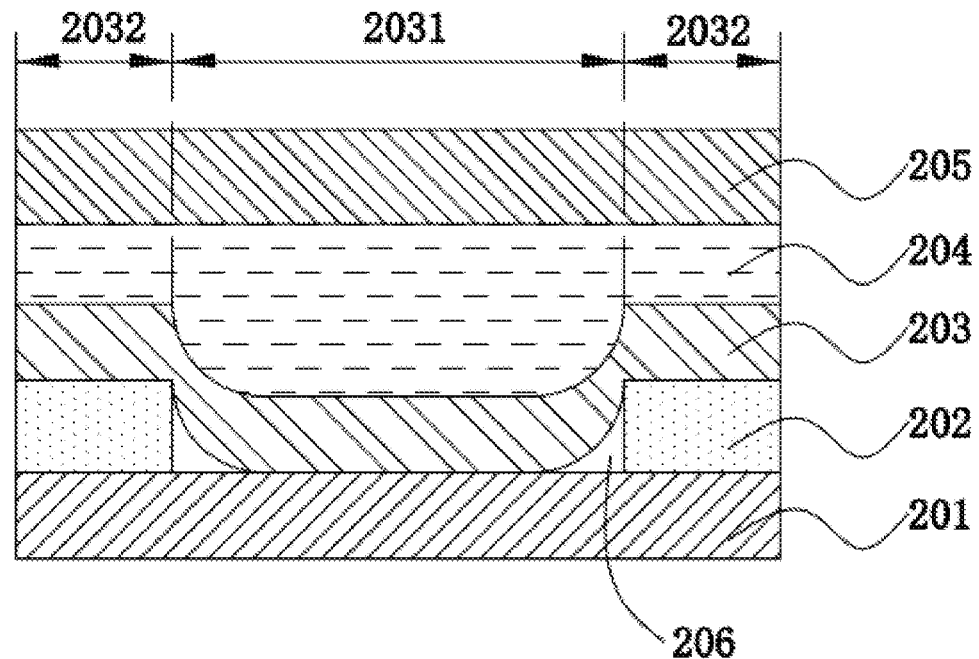

The surface of a side of the recess 2031 adjacent to the display panel 201 can be kept at a certain distance from the display panel 201. Preferably, in order to reduce the space between the display panel 201 and the touch panel 203, a minimum vertical distance between the surface of the side of the recess 2031 adjacent to the display panel 201 and the display panel 201 may be zero. For example, as shown in FIG. 2B, a vertex of the curved surface is in contact with the display panel 201. For a further example, as shown in FIG. 2C, a section of the curved surface is in contact with the display panel 201. By comparison, the recess 2031 in this case allows the space of the cavity 206 to be minimized, thereby minimizing the space between the display panel 201 and the touch panel 203.

Still referring to FIGS. 2A-2C, the cavity 206 can be vacuumed to further improve sealing of the cavity 206 to prevent water vapor, dust, and the like from entering an interior of the cavity 206.

Figure 3A:
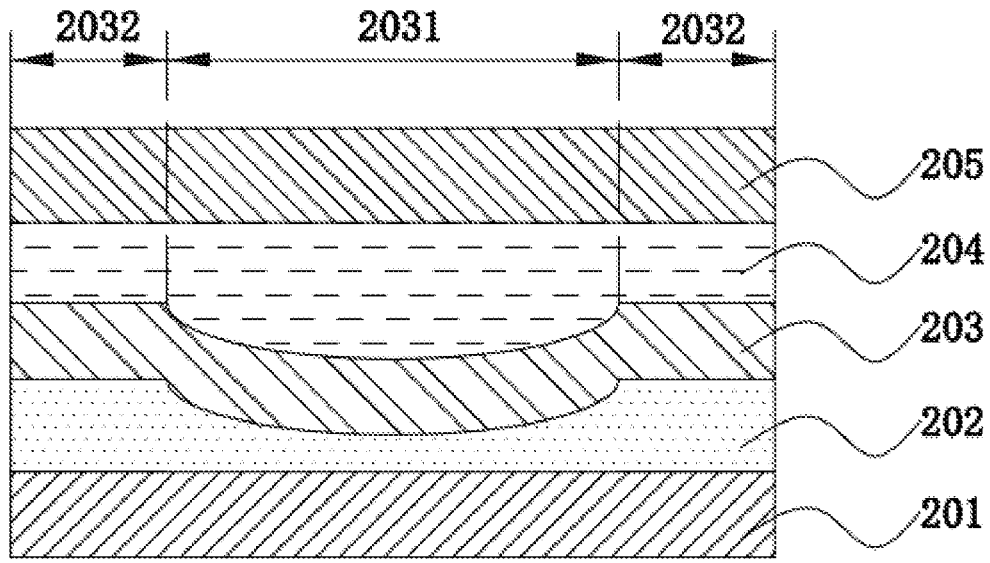
FIGS. 3A-3C are schematic cross-sectional diagrams of another touch display device according to Embodiment 1 of the present disclosure.
Figure 3B:
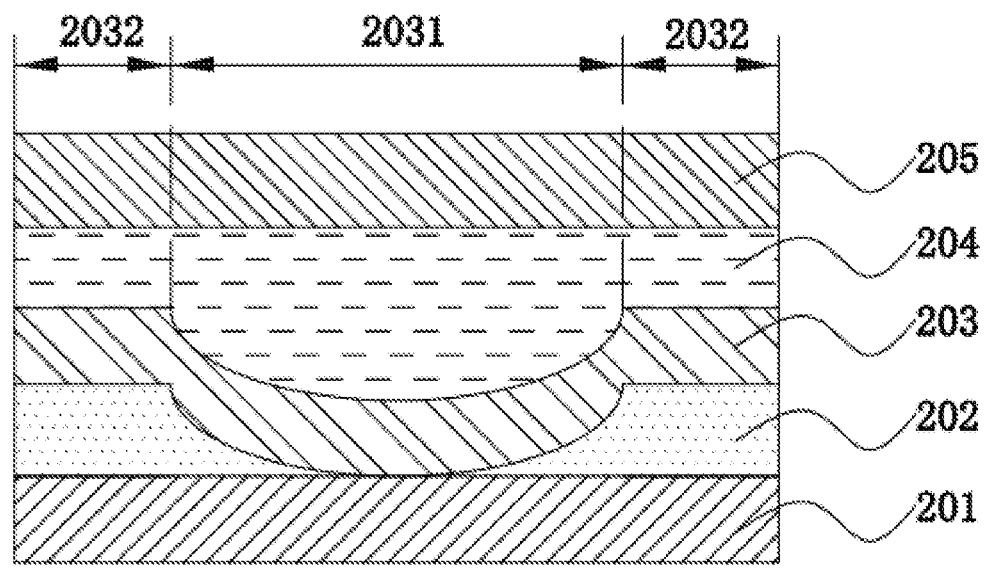
Figure 3C:
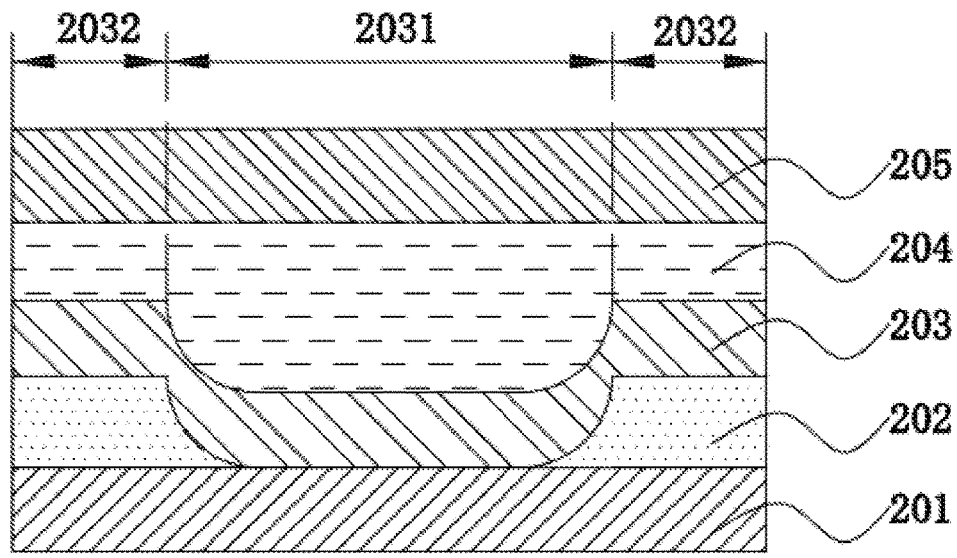

Preferably, a structure of the touch display device as shown in FIGS. 3A-3C is substantially similar to a structure of the touch display device shown in FIGS. 2A-2C, except that the vacuum in the cavity 206 is replaced by the first colloid 202, the first colloid 202 is completely filled in the cavity 206, so the space of the cavity 206 can be reduced to zero, and the display panel 201 is completely adhered to the touch control panel 203, thus further reducing the sense of separation between the display panel 201 and the touch panel 203, thereby improving the touch feeling of a user.

Figure 4A:
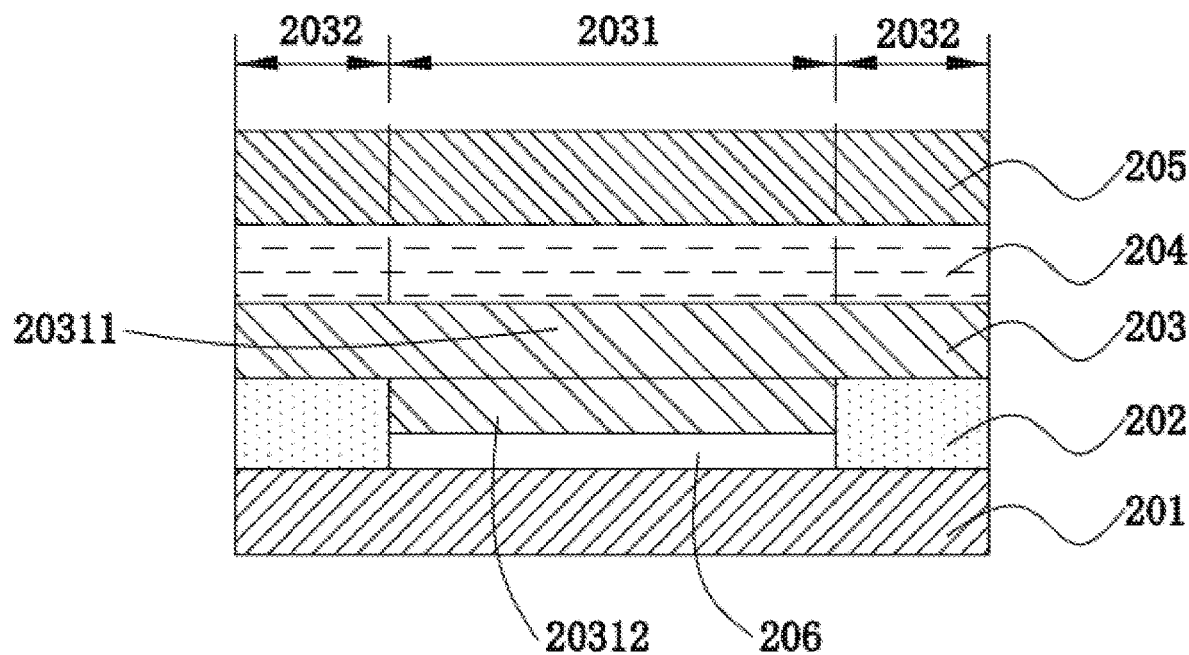
FIGS. 4A-4B are schematic cross-sectional diagrams of still another touch display device according to Embodiment 1 of the present disclosure.
Figure 4B:
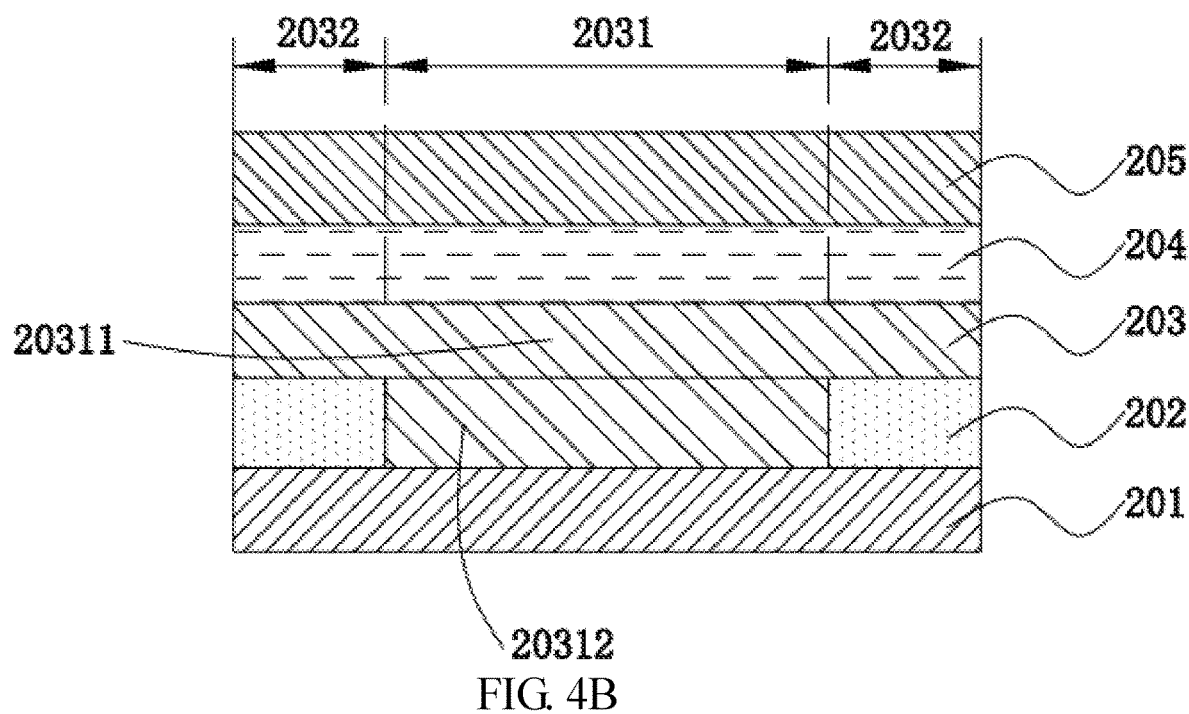

As shown in FIGS. 4A-4B, FIGS. 4A-4B are schematic cross-sectional diagrams of another touch display device according to the embodiment of the present disclosure, which has a structure substantially similar to the structure of the touch display device of FIGS. 2A-3C, except that a surface of the side of the touch panel 203 adjacent to the cover plate 205 is a horizontal surface, and the recess 2031 is not formed by slight deformation, wherein the recess includes a body portion 20311 and a convex portion 20312, the convex portion is disposed at the side of the touch panel 203 adjacent to the display panel 201, and the display panel 201, the convex portion 20312, and the first colloid 202 enclose the cavity 206.

Accordingly, a thickness of the touch panel 203 corresponding to the recess 2031 is greater than a thickness of the touch panel 203 corresponding to the bonding portion 2032. Optionally, the surface of the side of the recess 2031 adjacent to the display panel 201 may be a curved surface or a horizontal surface. Similarly, as shown in FIG. 4A, the surface of the side of the recess 2031 adjacent to the display panel 201 has a certain distance from the display panel 201, or as shown in FIG. 4B, a minimum vertical distance from the surface of the side of the recess 2031 adjacent to the display panel 201 to the display panel 201 is zero. In addition, the interior of the cavity 206 may be vacuumed or may be fully filled by the first colloid 202, and details will not be repeated herein for brevity.

Embodiment 2

Figure 5:
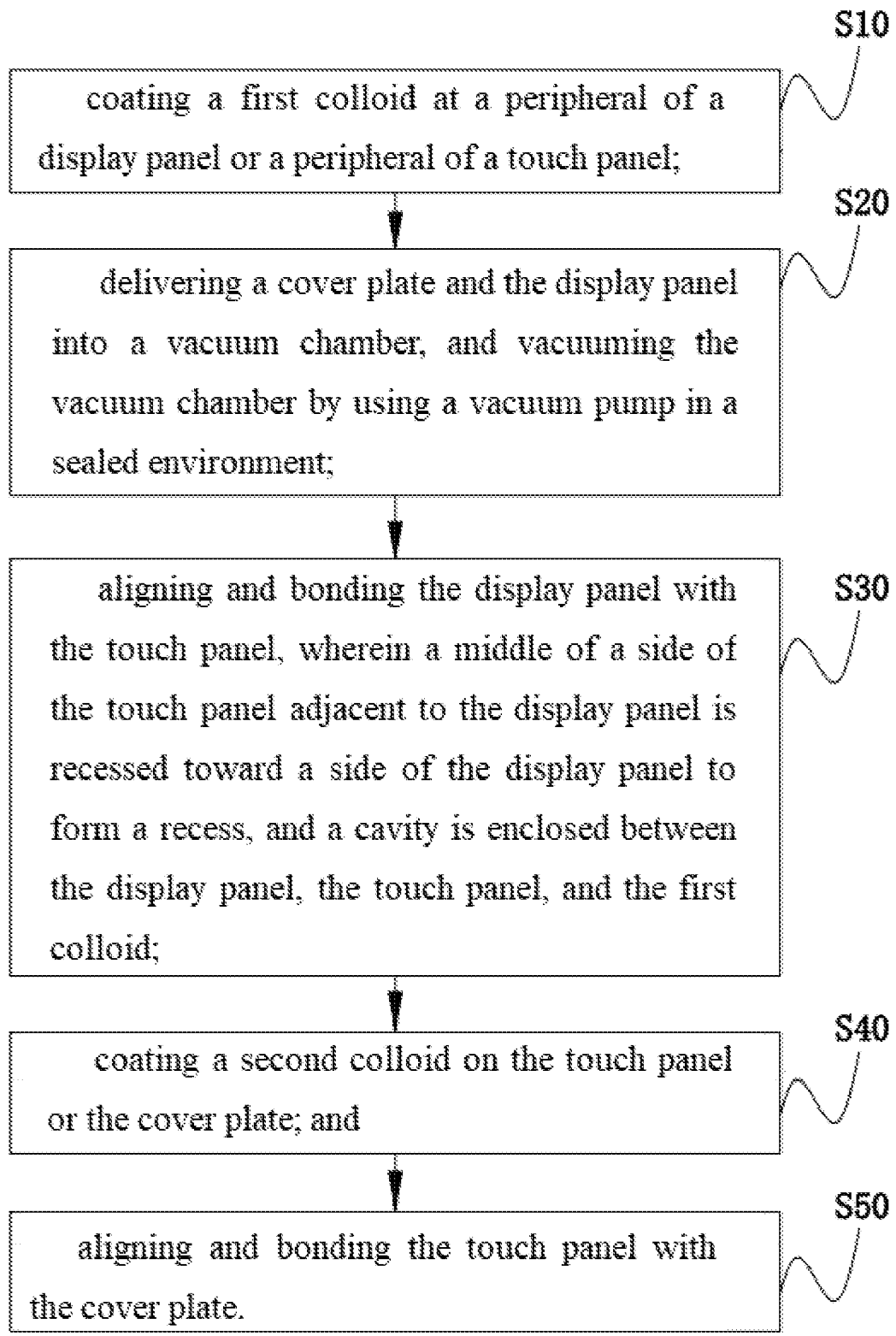
FIG. 5 is a flowchart of a method of fabricating a touch display device according to Embodiment 2 of the present disclosure.

As shown in FIG. 5, this embodiment of the present disclosure further provides a method of fabricating a touch display device, including the following steps:

S10: coating a first colloid at a peripheral of a display panel or a peripheral of a touch panel, wherein specifically, the first colloid is coated on an upper surface of the display panel or a peripheral of a lower surface of the touch panel, and the first colloid may be an optical glue;

S20: delivering the cover plate and the display panel into a vacuum chamber, and vacuuming the vacuum chamber by using a vacuum pump in a sealed environment;

S30: aligning and bonding the display panel with the touch panel, wherein a middle of a side of the touch panel adjacent to the display panel is recessed toward a side of the display panel to form a recess, and a cavity is enclosed between the display panel, the touch panel, and the first colloid, wherein specifically, the touch panel is placed on the upper surface of the display panel, and a CCD alignment or a tool-assisted positioning may be used for alignment, and the step S30 further includes the following steps:

S301: performing heat treatment on the display panel and the touch panel by using a heating device in the vacuum chamber to melt the first colloid in a vacuum environment, wherein specifically, in a vacuum environment, the first colloid is melted when heated to a certain temperature, to completely bond the peripheral of the display panel with the peripheral of the touch panel; and S302: irradiating the display panel and the touch panel with an ultraviolet ray, to cure the melted first colloid, such that the cavity is enclosed between the display panel, the touch panel, and the cured first colloid, wherein specifically, the first colloid completely fills the cavity, and the space of the cavity is reduced to zero to completely bond the display panel and the touch panel, thereby eliminating the sense of separation between the display panel 201 and the touch panel 203, improving the touch feeling of the user;

S40: coating a second colloid on the touch panel or the cover plate, wherein specifically, the second colloid is coated on an upper surface of the touch panel or a lower surface of the cover plate;

S50: aligning and bonding the touch panel with the cover plate, wherein specifically, the cover plate is placed on the upper surface of the touch panel, and similarly, the CCD alignment or the tool-assisted positioning can be used for alignment.

In this embodiment of the present disclosure, the display panel and the touch panel are bonded by frame-bonding, and a vacuum process is performed at the same time, so that the space of the cavity enclosed by the display panel, the touch panel, and the first colloids is reduced, and the touch panel is bonded with the cover plate by full-bonding. Of course, in other embodiments, the touch panel and the cover plate may also be bonded to each other by the method of the bonding the display panel with the touch panel and the related processing described above. Details can be referred to the foregoing embodiments, and are not repeated herein for brevity.

Beneficial effects of the present disclosure are that the present invention provides a touch display device and a method of fabricating the same, wherein by vacuuming a gap formed between a display panel and a touch panel, an area of the touch panel corresponding to the gap is recessed toward inside of the gap, thereby reducing a space occupied by the gap, eliminating a sense of separation between the display panel and the touch panel, improving the user's touch feeling, enhancing a waterproof and dustproof effect of the touch display device, elevating stability of the touch display device, and so on.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A touch display device, comprising:
   a display panel;
   a touch panel disposed on the display panel, wherein a side of the touch panel adjacent to the display panel is provided with a recess and a bonding portion surrounding the recess, the recess is located at a middle of the touch panel, the bonding portion is located at a peripheral of the touch panel, and the recess is recessed toward a side of the display panel; and
   a cover plate disposed on the touch panel,
   wherein a first colloid is disposed on an area corresponding to the bonding portion between the display panel and the touch panel, to bond the display panel with the touch panel; a second colloid is disposed between the touch panel and cover plate, to bond the touch panel with the cover plate; and a cavity is enclosed between the display panel, the touch panel, and the first colloid.

2. The touch display device according to claim 1, wherein a surface of a side of the recess adjacent to the display panel is a curved surface.

3. The touch display device according to claim 1, wherein a surface of a side of the touch panel adjacent to the cover plate is a horizontal surface, and a thickness of the touch panel corresponding to the recess is greater than a thickness of the touch panel corresponding to the bonding portion.

4. The touch display device according to claim 2, wherein a minimum vertical distance between the surface of the side of the recess adjacent to the display panel and the display panel is zero.

5. The touch display device according to claim 1, wherein the cavity is vacuumed.

6. The touch display device according to claim 1, wherein the first colloid completely fills the cavity to completely bond the display panel to the touch panel.

7. The touch display device according to claim 1, wherein the first colloid is made of an optical glue.

8. A touch display device, comprising:
   a display panel;
   a touch panel disposed on the display panel, wherein a side of the touch panel adjacent to the display panel is provided with a recess and a bonding portion surrounding the recess; and
   a cover plate disposed on the touch panel,
   wherein a first colloid is disposed on an area corresponding to the bonding portion between the display panel and the touch panel, to bond the display panel with the touch panel; a second colloid is disposed between the touch panel and cover plate, to bond the touch panel with the cover plate; and a cavity is enclosed between the display panel, the touch panel, and the first colloid.

9. The touch display device according to claim 8, wherein a surface of a side of the recess adjacent to the display panel is a curved surface.

10. The touch display device according to claim 8, wherein a surface of a side of the touch panel adjacent to the cover plate is a horizontal surface, and a thickness of the touch panel corresponding to the recess is greater than a thickness of the touch panel corresponding to the bonding portion.

11. The touch display device according to claim 9, wherein a minimum vertical distance between the surface of the side of the recess adjacent to the display panel and the display panel is zero.

12. The touch display device according to claim 8, wherein the cavity is vacuumed.

13. The touch display device according to claim 8, wherein the first colloid completely fills the cavity to completely bond the display panel to the touch panel.

14. The touch display device according to claim 8, wherein the first colloid is made of an optical glue.

15. The touch display device according to claim 14, wherein the first colloid is made of a hot melt adhesive.

16. The touch display device according to claim 8, wherein the first colloid has a rectangular ring shape.

17. A method of fabricating a touch display device, comprising the steps of:
    S10: coating a first colloid at a peripheral of a display panel or a peripheral of a touch panel;
    S20: delivering a cover plate and the display panel into a vacuum chamber, and vacuuming the vacuum chamber by using a vacuum pump in a sealed environment;
    S30: aligning and bonding the display panel with the touch panel, wherein a middle of a side of the touch panel adjacent to the display panel is recessed toward a side of the display panel to form a recess, and a cavity is enclosed between the display panel, the touch panel, and the first colloid;
    S40: coating a second colloid on the touch panel or the cover plate; and
    S50: aligning and bonding the touch panel with the cover plate.

18. The method of fabricating the touch display device according to claim 17, wherein the step S30 further comprises the following steps:
    S301: performing heat treatment on the display panel and the touch panel by using a heating device in the vacuum chamber to melt the first colloid in a vacuum environment; and
    S302: irradiating the display panel and the touch panel with an ultraviolet ray, to cure the melted first colloid, such that the cavity is enclosed between the display panel, the touch panel, and the cured first colloid.

19. The method of fabricating the touch display device according to claim 17, wherein in the step S30, a CCD alignment or a tool-assisted positioning is used for alignment.

20. The method of fabricating the touch display device according to claim 17, wherein the first colloid completely fills the cavity to completely bond the display panel and the touch panel.

* * * * *